Figure 1:
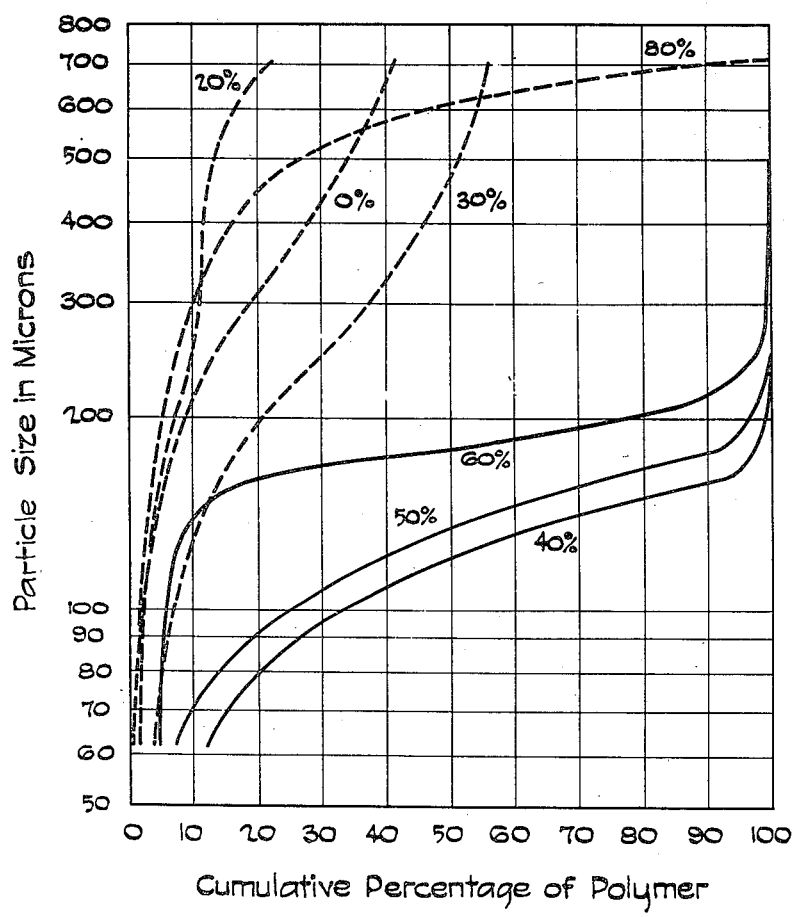

Patented Jan. 10, 1950

2,494,517

UNITED STATES PATENT OFFICE 2,494,517

GRANULAR POLYMERIZATION OF VINYL CHLORIDE

Marguerite Naps, Oakland, Calif., assignor to Shell Development Company, San Francisco, Calif., a corporation of Delaware Application November 15, 1948, Serial No. 60,156

12 Claims. (Cl. 260—13)

This invention relates to an improved method for effecting granular polymerization of vinyl chloride.

There is disclosed in U. S. 2,194,354 to Crawford a method for effecting granular polymerization of vinyl esters. According to the Crawford method, a vinyl ester is polymerized while agitated in admixture with water containing a small amount of a stabilizing colloid such as glycol cellulose or gelatine, and there is produced small granules or pearls of polymer which settle in the aqueous medium upon cessation of the agitation. This method is an advantageous improvement over the older emulsion methods of polymerizing vinyl esters wherein a latex-like suspension of polymer is obtained which requires use of some coagulation procedure in order to separate the polymer from the aqueous medium. The granular method permits the polymer to be separated directly by filtration without the necessity of first coagulating the polymer which, at best, is difficult and rather costly.

Although Crawford indicates that his process is equally applicable to polymerization of vinyl esters in general, including vinyl chloride, operating results are shown in the patent for only vinyl acetate. Vinyl chloride appears to be peculiar among the vinyl esters and does not give a useful product even though wide variations in the concentration of the stabilizing colloid and in the degree of agitation are followed in the search for conditions indicated as proper by Crawford. However, I have now found that by modifying and so improving the method as will be described hereinafter, a very satisfactory polymer of vinyl chloride can be obtained.

In order for a method of granular polymerization to operate successfully, it is essential that the particles of polymer do not grow in size and agglomerate into chunks or cakes. It is also essential that the polymer particles be of sufficient size at the end of the polymerization operation so that they will settle and may be filtered at reasonable rates from the liquid reaction medium. If the particle size is too small, the polymer will either pass through the filter, or will clog it so that the rate of filtration becomes impractical. Besides the foregoing essential requirements, it would be desirable if it were possible to have absolute uniformity of particle size. The uniformity is important in utilization of granular polyvinyl chloride. For example, most polyvinyl chloride is plasticized by incorporating the plasticizer with the polymer on a hot roll mill. However, decomposition and deterioration become more pronounced the longer the polymer is in contact with the hot rolls. The rate at which polymer particles are fluxed and rendered homogeneous with the plasticizer during the milling is dependent in part upon the particle size. Consequently, the granular polyvinyl chloride of variable size has the smaller particles plasticized first, but the mass must remain on the mill until the larger particles are also homogenized. It is therefore a principal object of the present invention to provide a process for producing granular polyvinyl chloride wherein the particles are as nearly uniform in size as possible while at the same time avoiding formation of particles so small that filtration of the reaction mixture is impracticable, or so large that chunks, cakes or reactor wall deposits of polymer are obtained.

I have now discovered that these objects may be accomplished by turbulently agitating and polymerizing liquid vinyl chloride containing 0.1% to 3.0% of a peroxide polymerization catalyst dissolved therein at a temperature of about 30° C. to 60° C., the liquid vinyl chloride being dispersed in 200% to 500% of a liquid medium consisting of water containing 35% to 65% by volume of a saturated aliphatic monohydric alcohol of up to 2 carbon atoms and a water-soluble methyl ether of a polysaccharide in amount of 0.02% to 0.4% by weight based upon the quantity of monomeric vinyl chloride initially present. In other words, for each 100 parts by weight of liquid vinyl chloride present initially as an agitated dispersion in the reaction mixture, there are present in parts by weight: 0.1 to 3 of a peroxide polymerization catalyst which is soluble in liquid monomeric vinyl chloride; 200 to 500 of a mixture of water and a saturated aliphatic monohydric alcohol of 1 to 2 carbon atoms containing 35% to 65% by volume of the alcohol; and 0.02 to 0.4 of a methyl ether of a polysaccharide. The alcohol is completely miscible with water, and best results are obtained by employing methyl alcohol.

The reaction system employed in the process of the present invention is very complex owing to its general nature and the number of possible variables. In general, the production of the desired granular polymer of most uniform size is dependent upon use in combination of the particular conditions and ingredients noted above. Since the effect of the conditions and ingredients is inter-locking, failure to utilize even one will so disrupt the effects of the others that polymer of the desired form will not be produced. The inter-locking relationship is more pronounced with respect to some of the conditions than others. Consequently, the permissible variations in some of the conditions are greater than those of others.

The concentration of the alcohol in the aqueous reaction medium employed in the process may vary from 35% to 65% by volume, the remainder being substantially all water since the other ingredient therein, the methyl ether of the polysaccharide, is present in such small proportions. While this range of percentages may seem somewhat broad, these limits are at the extremities of the operable range. Much better results with respect to uniformity of granular size are obtained within the preferred range of 40% to 60% by volume of alcohol. Most preferably, the polymerization is effected while employing about 50% alcohol in admixture with the water, i. e., 50± 2% alcohol.

With respect to the water-soluble methyl ether of polysaccharide employed in the process, the permissible limits of amounts thereof are much narrower and more critical. This substance should be present in amount of 0.02% to 0.4% by weight of the vinyl chloride. Preferably, the polymerization is effected with use of about 0.05% to 0.2% in order to realize best results. Within the operable range of 0.02% to 0.4% for substantial uniformity of particle size, the average size of particles can be controlled by the particular choice of concentration of the polysaccharide methyl ether. Thus, use of higher concentrations within the range enables production of polymer particles having smaller average size. This result provides a convenient means for control of the average particle size.

The methyl ether of a polysaccharide employed in the process is a colloid which functions as a stabilizer in the reaction system by preventing agglomeration of the polymer particles. In addition, this methyl ether enables emulsification of the monomeric vinyl chloride in the aqueous medium to occur. By its use, small monomer droplets are effectively dispersed throughout the agitated reaction mixture during the entire course of the polymerization. Nevertheless, upon discontinuing the polymerization after a relatively high degree of conversion has occurred, there is present a fine, substantially uniform, free-flowing polymer suspension which can be handled like an ordinary liquid in pumping operations and the like which are employed in large scale manufacturing processes. However, it is necessary to observe the above-noted limits of concentration in order to achieve the desired results.

The effect of variation in concentration of the alcohol in admixture with the water, and in the concentration of the methyl ether of a polysaccharide will be evident from the results given in Tables I and II.

Table I gives results on the particle size with different concentrations of methyl alcohol. In each case, 50 gms. of liquid vinyl chloride were charged to an elongated glass reaction tube and 125 cc. of the aqueous mixture containing the noted concentration of methyl alcohol were introduced. The reaction mixture also contained 0.15 gm. lauroyl peroxide as polymerization catalyst and 0.05 gm. of methyl cellulose which was of such character that, upon dissolving 2% in water, a solution was obtained having a viscosity of 1500 centipoises at 20° C. The charged reaction tubes were hermetically sealed so as to be devoid of oxygen or air, although they contained a small vapor space which enabled good agitation of the contents upon the tubes being tumbled. The reaction mixture in the tubes was heated and agitated by tumbling the tubes at 18 R. P. M. in a water bath maintained at 50° C. After 22 hours in the bath, the tubes were removed and cooled. They were then opened and the small amount of unpolymerized vinyl chloride allowed to escape.

The contents of each tube were subjected to a sieve analysis by wet screening in order to obtain a quantitative measure of the particle size distribution of the granular polyvinyl chloride. The obtained polymer slurry was diluted with water and poured onto the coarsest sieve of the series and washed through onto the next finer sieve with a spray of water. In Table I, the polymerization employing 0% of methyl alcohol had some polymer which adhered to the wall of the tube, and that employing 80% methyl alcohol had a reaction mixture which appeared substantially dry like moist sand, i. e., it was not free-flowing.

*Table I*

| Vol. Percent Methyl Alcohol | ASTM Sieve No. | Cumulative Portion of Polymer (in Percent) Passing Indicated Sieve | | | | | | | | | Caked Polymer |
|---|---|---|---|---|---|---|---|---|---|---|---|
| | | 230 | 200 | 140 | 115 | 100 | 80 | 60 | 35 | 25 | |
| | Sieve Opening in Microns | 62 | 74 | 105 | 132 | 149 | 177 | 250 | 500 | 710 | |
| 0 | | 0.2 | 0.5 | 1.6 | 3.0 | 4.4 | 6.8 | 12.8 | 34.0 | 41.4 | 12.4 |
| 20 | | 1.4 | 1.5 | 1.8 | 2.3 | 3.0 | 4.7 | 10.0 | 13.7 | 22.6 | 1.4 |
| 30 | | 3.6 | 4.5 | 7.1 | 9.3 | 12.2 | 16.5 | 30.1 | 51.0 | 55.5 | 0.5 |
| 40 | | 12.0 | 16.8 | 44.9 | 58.1 | 58.4 | 97.8 | 100 | 100 | 100 | 0 |
| 50 | | 7.0 | 11.0 | 26.1 | 48.0 | 63.9 | 90.8 | 100 | 100 | 100 | 0 |
| 60 | | 4.4 | 4.9 | 6.2 | 7.6 | 11.8 | 46.7 | 98.9 | 100 | 100 | 0 |
| 80 | | 0.2 | 0.4 | 0.9 | 1.8 | 2.2 | 3.3 | 7.0 | 37.3 | 100 | 0 |

Table II gives results of polymerization of vinyl chloride using the indicated amounts of methyl cellulose which again was of such type that a 2% solution in water gave a solution having a viscosity of 1500 centipoises at 20° C. The polymerization and analysis were effected in the same manner as described for those given in Table I except that the methyl alcohol concentration was 50% in each.

*Table II*

| Percent Methyl Cellulose | ASTM Sieve No. | Cumulative Portion of Polymer (in Percent) Passing Indicated Sieve | | | | | | | | | Caked Polymer |
|---|---|---|---|---|---|---|---|---|---|---|---|
| | | 230 | 200 | 140 | 115 | 100 | 80 | 60 | 35 | 25 | |
| | Sieve Opening in Microns | 62 | 74 | 105 | 132 | 149 | 177 | 250 | 300 | 710 | |
| 0.0 | | 0.6 | 0.9 | 1.2 | 1.4 | 1.7 | 2.2 | 3.4 | 11.2 | 27.4 | 2.2 |
| 0.02 | | 0.2 | 0.3 | 0.7 | 1.5 | 3.8 | 11.5 | 65.9 | 99.5 | 99.7 | 0 |
| 0.10 | | 7.0 | 11.0 | 26.1 | 48.0 | 63.9 | 90.8 | 100 | 100 | 100 | 0 |
| 0.50 | | 66.7 | 75.2 | 79.6 | 82.7 | 93.9 | 99.5 | 100 | 100 | 100 | 0 |
| 2.00 | | 76.2 | 80.2 | 88.4 | 93.4 | 95.7 | 98.7 | 100 | 100 | 100 | 0 |

Figure 2:
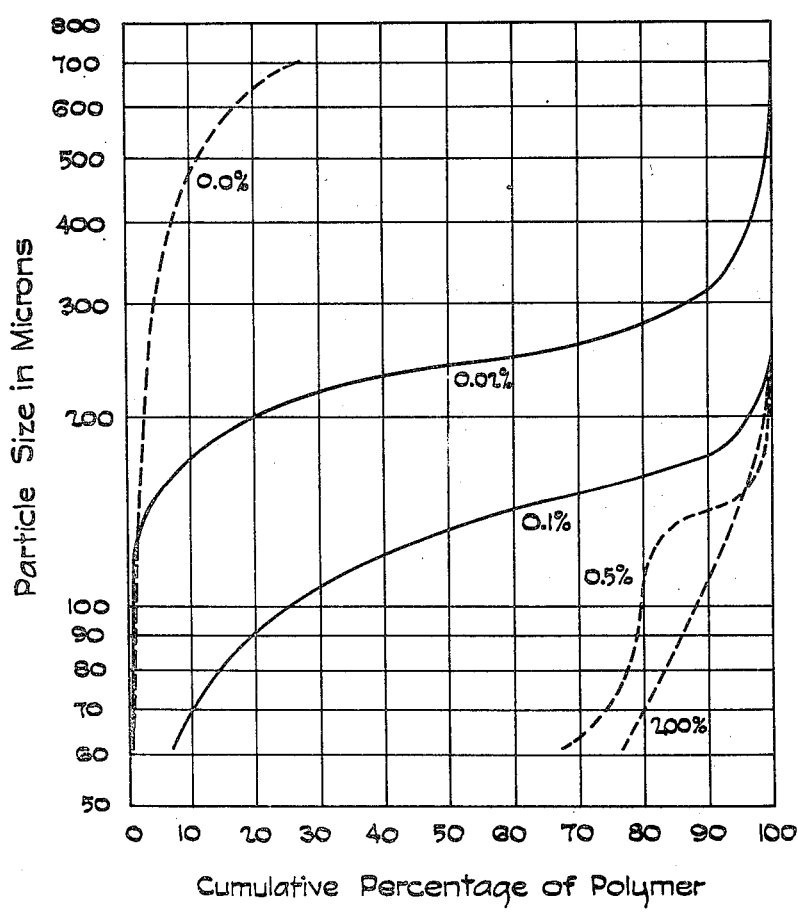

The results given in Tables I and II are more easily understood from the accompanying graphical plots, of which Figure 1 is a plot of the data in Table I and Figure 2 is a plot of the data in Table II.

As shown in Figure 1, it is evident that the granular size of the polyvinyl chloride is quite uniform when the methyl alcohol concentration is 50%. Moreover, when the methyl alcohol concentration is at the limits of the preferred range of 40% or 60%, the size distribution is still reasonably uniform. On the other hand, use of alcohol outside the permissible range, i. e., 0%, 20%, 30% or 80%, causes very large variations in the size of the formed granules.

Figure 2 shows that with no methyl cellulose present, the particles lack uniformity and, in fact, are coarse with caking present. When too large a quantity of methyl cellulose is employed, the particles not only lack uniformity, but contain such very fine polymer that filtration is slow. The use of the preferred 0.1% gives the best uniformity by far although from 0.02% to 0.4% is operable for substantial uniformity.

The stabilizing colloid employed in the process is a water-soluble methyl ether of a polysaccharide, i. e., it is the methyl ether of a polysaccharide having the empirical formula $C_6H_{10}O_5$, which ether contains sufficient methoxyl groups so as to be soluble in water at ordinary temperature (20° C.). Methyl cellulose having a degree of substitution of 1.3 to 2.6 is soluble in cold water and suitable for use in the process. Good results are obtained with methyl cellulose which gives a 2% aqueous solution having a viscosity of about 25 to 4000 centipoises at 20° C., although that giving about 1500 to 4000 centipoise is preferred.

Other methyl ethers of polysaccharides include methyl starch, again a variety sufficiently substituted so as to be soluble in cold water being necessary. Thus, polymerizaion of vinyl chloride using methyl starch having a methoxyl content of only 0.07 equivalents per $C_6H_{10}O_5$ unit which was insoluble in water resulted in polyvinyl chloride of varied particle size with poor uniformity and considerable caking. On the other hand, polymerization of vinyl chloride in the tumbling tubular reactor for 22 hours at 50° C. using 0.3% lauroyl peroxide and 225% of an aqueous solution containing 50% by volume of methyl alcohol along with 0.2% (based upon the vinyl chloride) of methyl starch containing 1.52 or 1.65 equivalents of methoxyl per $C_6H_{10}O_5$ unit gave granular polyvinyl chloride free of caking which was fine and of good uniformity in particle size. The water-soluble methyl ethers of other polysaccharides such as insulin, glycogen or dextrin are also suitable for use in the process.

An important result is realized by polymerizing the vinyl chloride with the reaction system of the present invention. As noted, the reaction mixture employs only the mixture of alcohol and water, the peroxide catalyst and the methyl ether of the polysaccharide. None of these substances is of ionic character, and consequently, the formed polyvinyl chloride is not only of ideal physical form, but also has excellent electrical resistivity, which property is of vital importance when the polymer is utilized as an insulating covering for electrical wire and the like. Volume resistivities of 100 to $259 \times 10^{12}$ ohm-cm. are obtained with the polymer from the process of the invention which about $1 \times 10^{12}$ ohm-cm. for polymer produced in systems employing either ionic or non-ionic dispersing agents or colloidal agents.

The methyl ether of a polysaccharide appears to be unique for operability of the present process using the mixture of methyl or ethyl alcohol and water as the polymerization medium. Tests with a great variety of possible substances as stabilizing colloids resulted in failure because of formation of polyvinyl chloride which had non-uniform particle size, coarse particles, caking and/or polymer deposit on the walls of the reaction vessel. Reference is made to tests with ethyl cellulose, hydroxy ethyl cellulose (glycol cellulose), carboxymethyl cellulose, gelatin, agar-agar and starch.

The polymerization is effected at a temperature of 30° C. to 60° C. The lower limit of the temperature range is governed by the fact that at below 30° C. the rate of polymerization becomes too slow to be practicable. At temperatures above 60° C., the resulting polyvinyl chloride is of such poor quality with respect to molecular weight and the properties dependent thereon, that it has little value for manufacturing useful articles therefrom. Preferably, operation is conducted at a temperature of 40° C. to 50° C., and particularly good results are obtained at 45° C. to 50° C., inclusive. The best results are obtained by maintaining the polymerizing mixture as nearly as possible at a chosen temperature throughout the polymerization. Use of a single temperature gives polyvinyl chloride of most uniform quality. When executing the process in batch-wise manner, it will, of course, be necessary to heat the reaction mixture to the desired reaction temperature. However, since the polymerization reaction of vinyl chloride is highly exothermic, it may be necessary to cool the reaction mixture, rather than heat it, after the polymerization is under way.

Variation in the concentration of peroxide catalyst does not too markedly affect the polymerization although it is, in general, desirable to employ about 0.1% to 3% of the vinyl chloride. Below about 0.1%, the rate of polymerization becomes unreasonably slow, while at concentrations appreciably above 3% the polymer is subject to burning when milled which is undesirable. Good results are obtained at about 0.2% to 1%, and use of about 0.15% to 0.3%, especially with lauroyl peroxide, is particularly suitable. In order to effect the desired granular polymerization, the invention employs a monomer-soluble peroxide, i. e., soluble to at least 5% by weight in liquid monomeric vinyl chloride at the operating temperature. Although lauroyl peroxide is a preferred catalyst, other suitable peroxides include acetyl peroxide, dicaprylyl peroxide, stearoyl peroxide, acetyl benzoyl peroxide, 2,4-dichlorobenzoyl peroxide, and benzoyl peroxide. Mixtures of peroxides may be used if desired.

The quantity of aqueous alcohol medium used in the process is about 200% to 500% of the vinyl chloride. Use of appreciably below 200% of the aqueous alcohol gives a reaction mixture after the polymerization wherein the granular polyvinyl chloride resembles moist sand. This is because the granular polyvinyl chloride, unlike polymers of such compounds as vinyl acetate or methyl methacrylate, has a marked tendency to absorb water and alcohol from the reaction mixture. Any technical scale commercial production of polyvinyl chloride is effected with the polymerization being conducted in an autoclave fitted with a mechanical rotating stirrer to provide the necessary agitation. It is apparent that if so little aqueous medium is used in the reaction mixture that the mixture acquires the consistency of moist sand by the time polymerization has progressed to a practical degree, the needed stirring of the reaction mixture becomes impossible. The reaction mixture must at least remain as a fluid slurry. It has been found that at least 200% of aqueous alcohol based upon the weight of vinyl chloride is necessary in order that the reaction mixture containing the granular polymer will have the needed fluidity. About 200% to 500% is used in the process. A particularly preferred amount is about 225%, and 220% to 250% is desirable although 200% to 300% is very suitable.

Good results were obtained within the range of 200% to 500% aqueous alcohol as is illustrated in Table III below. Vinyl chloride was polymerized in the aforementioned tumbling tubes at 50° C. for 22 hours, each case employing the noted amounts of aqueous methyl alcohol of the stated concentrations. There had also been added to the vinyl chloride 0.3% of lauroyl peroxide as catalyst and 0.1% of methyl cellulose (1500 C. P. S.) as stabilizer. It will be noted that the use of only 30% by volume of methyl alcohol gave unsuitable polymer in all cases.

*Table III*

| Wt. Per Cent Aq. Medium | Vol. Per Cent Methanol in Medium | Per Cent Conv. to Polymer | Nature of Granules | |
|---|---|---|---|---|
| | | | Size | Uniformity |
| 225 | 50 | 88 | Very fine | Very good. |
| 225 | 40 | 90 | ___do___ | Do. |
| 225 | 30 | 92 | Coarse | Poor. |
| 250 | 50 | 90 | Very fine | Very good. |
| 250 | 40 | 90 | ___do___ | Do. |
| 250 | 30 | 92 | Coarse | Poor. |
| 300 | 50 | 87.5 | Very fine | Very good. |
| 300 | 40 | 95 | Fine | Do. |
| 300 | 30 | 92.5 | Very coarse | Fair. |
| 350 | 50 | 85 | Fine | Very good. |
| 350 | 40 | 90 | ___do___ | Do. |
| 350 | 30 | 92.5 | Coarse | Fair. |
| 400 | 50 | 92.5 | Fine | Very good. |
| 400 | 40 | | ___do___ | Do. |
| 400 | 30 | 90 | Coarse | Poor. |

The use of methyl alcohol in the aqueous medium is most preferred for several reasons, namely, because the rate of polymerization is highest, because the particle size of the granular polymer is most uniform, and because the resulting polymer has the greatest molecular weight. The use of ethyl alcohol in place of methyl alcohol gives reasonably good uniformity to the granules of polymer although some decrease in molecular weight of the polymer results. Each of these alcohols displays the same limits of criticality with respect to the proportion (35% to 65% by volume) in admixture with water. A mixture of the two alcohols may be used if desired. Higher alcohols than ethyl are entirely unsuitable because they cause low rates of polymerization, do not permit formation of substantially uniform sized particles, or cause the molecular weight of the polymer to be so low that its physical strength and the like is unsuitable. Some of the higher alcohols also cause formation of wall deposits and caking.

The results obtainable using various alcohols are shown in Table IV. In each case vinyl chloride was polymerized in tubes tumbling at 18 R. P. M. for 22 hours at 50° C., and for each 50 gms. of vinyl chloride there was present 0.15 gm. of lauroyl peroxide with 0.05 gm. of methyl cellulose (1500 C. P. S.) and 125 cc. of an aqueous medium containing 50% by volume of the noted alcohol. Results from use of ethylene glycol and alcohols higher than ethyl alcohol show that these alcohols are deficient in one or more respects of giving poor conversions, low molecular weight polymer, non-uniformity, and cause caking and wall deposits of polymer, freedom from the last of which is the first requirement for successful operation of granular polymerization processes.

*Table IV*

| Alcohol | Per Cent Conv. to Polymer | Character of Product | | | | |
|---|---|---|---|---|---|---|
| | | Particle Size | Uniformity | Caking | Wall Deposit | Mol. Wt. |
| Methanol | 88 | Very fine | Excellent | None | None | 100,000 |
| Ethanol | 86 | Medium fine | Good | ___do___ | ___do___ | 83,000 |
| Isopropanol | 36 | Medium | ___do___ | Some | ___do___ | 58,000 |
| Butanol-1 | 52 | Varied | Fair | None | ___do___ | 72,000 |
| Butanol-2 | 24 | ___do___ | ___do___ | ___do___ | ___do___ | 40,000 |
| Tert-Butanol | 84 | (Soft cake) | | Severe | Soft | |
| Hexanol-1 | 30 | Varied | Poor | ___do___ | Large | |
| Ethylene Glycol | (¹) | ___do___ | ___do___ | ___do___ | Very large | |

¹ Extreme caking prevented determination of conversion.

The process of the invention is effected while subjecting the two-phase reaction mixture to turbulent agitation. The agitation need not be violent since it is only sufficient to cause turbulence in the contents of the tumbling tubes which were tumbled at a slow rate. Violently turbulent agitation may be used, if desired, of course. In general, more violent agitation causes the average particle size to be smaller. The turbulent agitation soon causes the liquid vinyl chloride to be broken up into small droplets, and the very efficient action of the methyl ether of a polysaccharide enables the vinyl chloride to be present in the nature of a reasonably stable emulsified form during the initial part of the polymerization. Nevertheless, as soon as substantial polymerization has occurred, the reaction system becomes such that the polymer granules will settle therein upon cessation of the agitation. The behavior of the reaction mixture of the process thus differs markedly from that wherein an emulsifying agent like soap is used and the polymer is obtained in a latex-like form so as to remain suspended in the liquid medium upon cessation of agitation.

The process of the invention may be executed in any suitable manner. The process is not limited to being conducted in any particular apparatus, but for large scale commercial manufacture it is preferred to effect the polymerization in autoclaves fitted with rotating stirrers. If a vapor space is present in the reaction vessel, best results are obtained with a substantially oxygen-free atmosphere over the stirred reaction contents such as is attained with vinyl chloride vapor. The pressure employed may vary with the operating temperature, but in any event is sufficient to keep the monomeric vinyl chloride in limited phase while dispersed in the reaction medium.

The polymerization reaction may be continued until substantially complete, i. e., until at least 80% of the vinyl chloride is converted into polymer. While the formed granules of polymer will settle in the aqueous medium upon cessation of agitation, the mixture is easily pumped as a slurry with ordinary reciprocating or centrifugal pumps for the operation of filtration or centrifugation which is used to separate the granular polymer from its liquid medium. The recovered polymer may be used as such, or may be subjected to washing with water or dilute base. The granular polymer is dried by gentle heating.

The following example is given for the purpose of illustrating execution of the invention in the preferred manner:

A glass-lined autoclave of about 35 gallons full capacity fitted with a rotating stainless steel stirrer and a sealed water-cooled condenser was used as reactor. The reactor had an internal diameter of 20 inches of vertical cylindrical shape. It was fitted with dished heads and had a centermost internal height of 36 inches. The stirrer consisted of a vertical rotating round rod to the bottom of which were affixed three rectangular blades 120 degrees apart. The blades rotated in a 10 inch diameter and were 1½ inches wide. They were set so there was no propeller action therefrom and the blades were rotated about 2 inches from the bottom of the reactor. The vessel also contained two 2 x 8 inch rectangular baffle blades affixed one above the other on a rod attached to the inside top of the reactor. These were spaced about 2 inches apart and were pointed toward the rotating blade shaft. The lower one was about 2 inches above the rotating blades.

The air was purged from the reactor with vinyl chloride vapor and was charged with 25 kg. of liquid vinyl chloride under pressure. There were also introduced other ingredients according to the following recipe: For each 100 parts by weight of vinyl chloride, there were used 100 parts of methyl alcohol, 125 parts of water (made a 50% by volume aqueous alcohol mixture), 0.15 parts of lauroyl peroxide and 0.1 part of methyl cellulose (1500 C. P. S. grade). This material filled the reactor about two-thirds full. The contents were agitated by rotating the stirrer at 390 R. P. M. at 50° C. for 24.5 hours. The conversion to polymer was 85%.

The resulting polyvinyl chloride was in the form of fine granules of substantially uniform size; 100% passing through a 120-mesh A. S. T. M. screen, 98.5% through a 140-mesh screen, 37.5% through a 200-mesh screen and 12.5% through a 230-mesh screen.

The process of the invention is particularly applicable for homopolymerization of vinyl chloride. If desired, the process may be used to copolymerize vinyl chloride with other compounds such as vinyl bromide, vinyl acetate, vinylidene chloride, styrene, acrylonitrile, methyl methacrylate and the like, which contain a

group. In preparing copolymers, it is preferred to use a predominant proportion of vinyl chloride with the other polymerizable compound or compounds, i. e., at least 90% vinyl chloride in the mixture of compounds, although down to a major proportion may be used if desired.

I claim as my invention:

1. A process for producing granular polymer of vinyl chloride having substantially uniform particle size which comprises turbulently agitating and polymerizing dispersed liquid vinyl chloride in an aqueous alcohol medium at a temperature of 30° C. to 60° C., the reaction mixture containing in percentage by weight of the initial monomer: 0.1% to 3% of a peroxide polymerization catalyst soluble in liquid vinyl chloride, 0.02% to 0.4% of a methyl ether of a polysaccharide soluble in water at 20° C., and 200% to 500% of water containing 35% to 65% by volume of a saturated monohydric alcohol of 1 to 2 carbon atoms.

2. A process for producing granular polyvinyl chloride which comprises polymerizing dispersed liquid vinyl chloride with turbulent agitation at 30° C. to 60° C. in a mixture consisting of 0.1% to 3% of peroxide polymerization catalyst soluble in liquid vinyl chloride, 0.02% to 0.4% of methyl cellulose soluble in water at 20° C., and 200% to 500% of a liquid medium, the percentages being based upon the weight of the vinyl chloride, and said liquid medium containing water and 35% to 65% by volume of a saturated monohydric alcohol of up to 2 carbon atoms.

3. A process for producing granular polyvinyl chloride which comprises polymerizing vinyl chloride with turbulent agitation at a temperature of 30° C. to 60° C. under sufficient pressure at the operating temperature to liquefy the vinyl chloride dispersed in a reaction mixture which consists in parts by weight per hundred of the vinyl chloride: 0.1 to 3 parts of peroxide polymerization catalyst soluble in liquid vinyl chloride, 0.02 to 0.4 part of a methyl ether of a polysaccharide soluble in water at 20° C., and 200 to 500 parts of an aqueous mixture containing 35% to 65% by volume of a saturated monohydric alcohol of 1 to 2 carbon atoms.

4. A process for producing granular polyvinyl chloride which comprises polymerizing vinyl chloride with turbulent agitation at a temperature of 40° C. to 50° C. under sufficient pressure at the operating temperature to liquefy the vinyl chloride dispersed in a reaction mixture which consists in parts by weight per hundred of the vinyl chloride: 0.1 to 3 parts of peroxide polymerization catalyst soluble in liquid vinyl chloride, 0.02 to 0.4 part of a methyl ether of a polysaccharide soluble in water at 20° C., and 200 to 300 parts of an aqueous mixture containing about 50% by volume of a saturated monohydric alcohol of 1 to 2 carbon atoms.

5. A process for producing granular polyvinyl chloride which comprises polymerizing vinyl chloride with turbulent agitation at a temperature of 30° C. to 60° C. under sufficient pressure at the temperature to liquefy the vinyl chloride dispersed in a reaction mixture which consists in parts by weight per hundred of the vinyl chloride: 0.1 to 3 parts of peroxide polymerization catalyst soluble in liquid vinyl chloride, 0.02 to 0.4 part of a methyl ether of a polysaccharide soluble in water at 20° C., and 200 to 500 parts of an aqueous mixture containing 35% to 65% by volume of methyl alcohol.

6. A process for producing granular polyvinyl chloride which comprises polymerizing dispersed liquid vinyl chloride with turbulent agitation at 40° C. to 50° C., inclusive, in a mixture consisting of 0.2% to 1% of peroxide polymerization catalyst soluble in liquid vinyl chloride, 0.02% to 0.4% of methyl cellulose soluble in water at 20° C., and 200% to 300% of a liquid medium, the percentages being based upon the weight of the vinyl chloride, and said liquid medium containing water and 40% to 60% by volume of methyl alcohol.

7. A process for producing granular polyvinyl chloride which comprises polymerizing vinyl chloride at a temperature of about 50° C. under sufficient pressure at that temperature to liquefy the vinyl chloride dispersed with turbulent agitation in a reaction mixture which consists in parts by weight per hundred of the vinyl chloride: 0.15 to 0.3 part of lauroyl peroxide, 0.05 to 0.2 part of methyl cellulose giving a 2% aqueous solution having a viscosity of about 1500 to 4000 centipoises at 20° C., and 220 to 250 parts of an aqueous mixture containing about 50% by volume of methyl alcohol.

8. A process for producing granular polyvinyl chloride which comprises polymerizing dispersed liquid vinyl chloride with turbulent agitation at 30° C. to 60° C. in a mixture consisting of 0.1% to 3% of peroxide polymerization catalyst soluble in liquid vinyl chloride, 0.02% to 0.4% of a methyl starch soluble in water at 20° C., and 200% to 500% of a liquid medium, the percentages being based upon the weight of the vinyl chloride, and said liquid medium containing water and 35% to 65% by volume of a saturated monohydric alcohol of 1 to 2 carbon atoms.

9. A process for producing granular polyvinyl chloride which comprises polymerizing vinyl chloride at a temperature of about 50° C. under sufficient pressure at that temperature to liquefy the vinyl chloride dispersed with turbulent agitation in a reaction mixture which consists in parts by weight per hundred of the vinyl chloride: 0.15 to 0.3 part of lauroyl peroxide, 0.05 to 0.2 part of methyl starch soluble in water at 20° C., and about 220 to 250 parts of an aqueous mixture containing about 50% by volume of methyl alcohol.

10. A process for producing granular polyvinyl chloride which comprises polymerizing vinyl chloride with turbulent agitation at a temperature of 30° C. to 60° C. under sufficient pressure at the temperature to liquefy the vinyl chloride dispersed in a reaction mixture which consists in parts by weight per hundred of the vinyl chloride: 0.1 to 3 parts of peroxide polymerization catalyst soluble in liquid vinyl chloride, 0.02 to 0.4 part of a methyl ether of a polysaccharide soluble in water at 20° C., and 200 to 500 parts of an aqueous mixture containing 35% to 65% by volume of ethyl alcohol.

11. A process for producing granular polyvinyl chloride which comprises polymerizing dispersed liquid vinyl chloride with turbulent agitation at 40° C. to 50° C., inclusive, in a mixture consisting of 0.2% to 1% of peroxide polymerization catalyst soluble in liquid vinyl chloride, 0.05% to 0.2% of methyl cellulose soluble in water at 20° C., and 200% to 300% of a liquid medium, the percentages being based upon the weight of the vinyl chloride, and said liquid medium containing water and 40% to 60% by volume of ethyl alcohol.

12. A process for producing granular polyvinyl chloride which comprises polymerizing vinyl chloride at a temperature of about 50° C. under sufficient pressure at that temperature to liquefy the vinyl chloride dispersed with turbulent agitation in a reaction mixture which consists in parts by weight per hundred of the vinyl chloride: 0.15 to 0.3 part of lauroyl peroxide, 0.05 to 0.2 part of methyl cellulose giving a 2% aqueous solution having a viscosity of about 1500 to 4000 centipoises at 20° C., and 220 to 250 parts of an aqueous mixture containing about 50% by volume of ethyl alcohol.

MARGUERITE NAPS.

No references cited.